March 2, 1971     T. M. WILLIAMS     3,567,463
FOOD FLAVORING PACKET FOR CONTAINERS
Filed Feb. 6, 1969
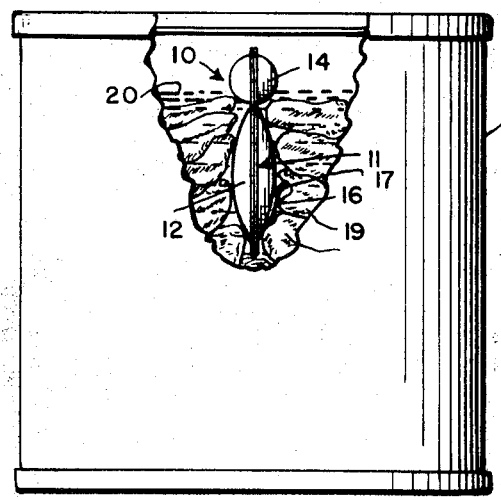
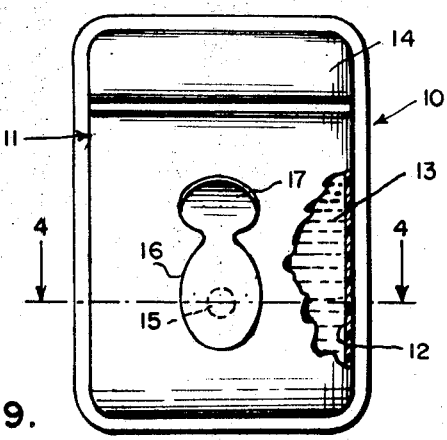
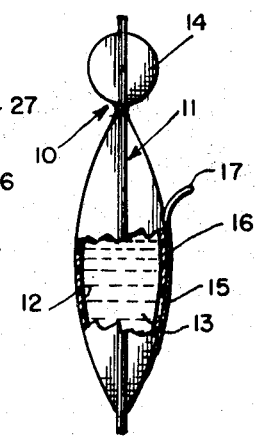
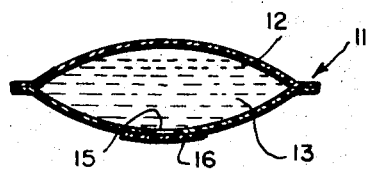
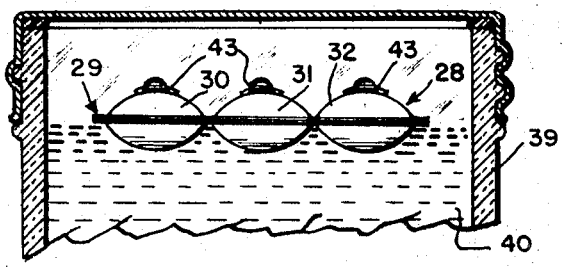
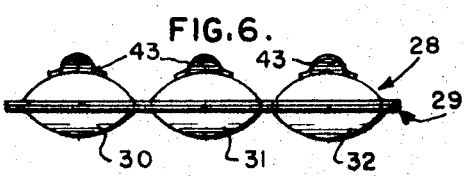
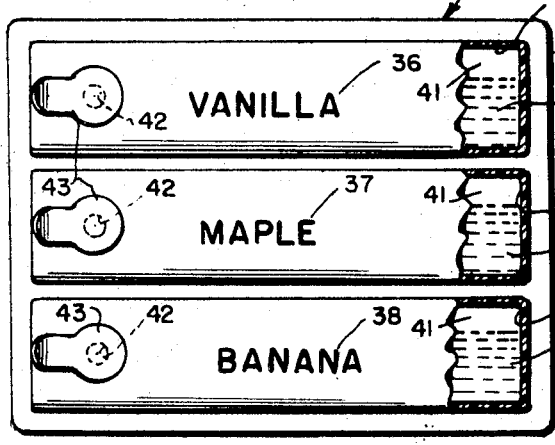
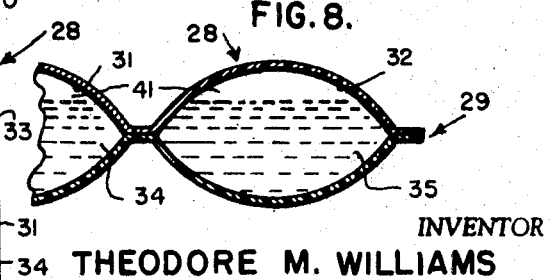
INVENTOR
THEODORE M. WILLIAMS
BY *John N. Randolph*
ATTORNEY

United States Patent Office 3,567,463
Patented Mar. 2, 1971

3,567,463
FOOD FLAVORING PACKET FOR CONTAINERS
Theodore M. Williams, 816 N. Ridgewood Ave.,
Daytona Beach, Fla. 32014
Filed Feb. 6, 1969, Ser. No. 796,984
Int. Cl. B65d 81/32
U.S. Cl. 99—171                             8 Claims

ABSTRACT OF THE DISCLOSURE

A packet containing a food flavoring buoyantly supported in the liquid of a food container packaged for sale to a consumer, so that the packet will be readily accessible for removal when the container is opened, to be utilized for flavoring the food contents of the container.

SUMMARY

It is a primary object of the present invention to provide a sealed envelope containing a food flavoring material which is capable of being buoyantly supported on the surface of the liquid contents of a food container, such as a can or jar, in which food products are packaged for consumer sale, so that the packet can be readily removed when the container is opened and the contents thereof are utilized for flavoring the food contents.

Another object of the invention is to provide such a packet including means to enable the packet to be readily opened for removing the flavoring material therefrom.

Still another object of the invention is to provide a packet formed of a heat resistant material capable of resisting the heat and pressure incident to canning processes.

Various other objects and advantages of the invention will hereinafter become more fully apparent from the following description of the drawing, illustrating presently preferred embodiments thereof, and wherein:

BRIEF DESCRIPTION OF THE DRAWING

FIG. 1 is a side elevational view, partly in section, illustrating a preferred embodiment of the food packet disposed in a can of oysters or clams, packaged for sale to a consumer;

FIG. 2 is an enlarged side elevational view, partly in section, of the food flavoring packet;

FIG. 3 is an edge elevational view, partly in section, thereof;

FIG. 4 is a cross-sectional view taken substantially along a plane as indicated by the line 4—4 of FIG. 2;

FIG. 5 is a fragmentary vertical sectional view of a portion of a jar containing a food product and illustrating a slightly different embodiment of the invention contained therein;

FIG. 6 is an enlarged edge elevational view of the flavoring packet of FIG. 5;

FIG. 7 is a top plan view thereof, partly in section;

FIG. 8 is a fragmentary cross-sectional view thereof, and

FIG. 9 is an edge elevational view, partly in vertical section, of a third embodiment of the food flavoring packet.

DESCRIPTION OF THE PREFERRED EMBODIMENT

Referring more specifically to the drawing and first to reference to FIGS. 1 to 4, the packet for containing a food flavoring as disclosed therein and designated generally 10 includes a sealed envelope 11 formed of heat resistant, flexible material, such as, a plastic or a metal foil and which includes a large compartment 12 containing the flavoring material 13, and a second, normally smaller, compartment 14 which is filled with a gas, such as air. One wall of the envelope 11 has an opening 15, as seen in FIGS. 3 and 4, which communicates with the compartment 12 and which is initially closed and sealed by a sealing strip 16 which may be of the same material as the envelope 11 and which is suitably bonded or otherwise secured to the exterior of the envelope 11 so as to close and seal the opening 15. One end 17 of the strip 16 is left unsecured to the envelope 11 to provide a tab which may be readily grasped between the thumb and index finger for stripping the sealing member 16 from the envelope 11 so that the flavoring material 13 can be extruded from the compartment 12 through the opening 15.

The packet 10 is shown in FIG. 1 contained within a can 18 of oysters or clams 19, which are packed in a liquid 20. The gas filled compartment 14 will buoyantly support the packet 10 so that said compartment will be disposed on the surface of the liquid contents 20 of the can. Thus, when the can 18 is opened, the packet 10 will be readily accessible for removal from the food contents 19, 20 so that the flavoring material 13 can be removed from the compartment 12, as previously described, and utilized for flavoring the oysters or clams 19. The flavoring material 13 could constitute a New England or Manhattan style sauce or could be a sauce recipe of a famous chef.

FIG. 9 illustrates a slightly different embodiment of the packet, designated generally 21, including an envelope 22 having only a single compartment 23 which is partially filled with the flavoring material 24, leaving a remaining space 25 containing the gas to render the packet 21 buoyant when applied to the can 18. The envelope 22 has a discharge port 26 and a sealing strip 27 corresponding to the port 15 and strip 16, respectively, of the envelope 11.

FIGS. 5 to 8 illustrate another embodiment of the packet, designated generally 28 and comprising a sealed envelope 29 which may be formed of the same material or materials as the envelopes 11 and 22 but which includes a plurality of separate compartments 30, 31, 32 containing different flavoring materials 33, 34 and 35, respectively. The flavoring materials of the compartments 30, 31, and 32 are identified by the legends 36, 37 and 38 printed thereon. The packet 28 is illustrated in FIG. 5 applied to a sealed jar 39 containing a food 40 in a liquid form, for example, a diet food which is left unflavored or has only a base flavor. The compartments 30, 31 and 32 are only partially filled with the flavoring materials leaving in each a chamber 41 filled with a gas, such as air, to render the packet 28 buoyant so that the packet will float on the surface of the food 40, as seen in FIG. 5. Additionally, each compartment 30, 31 and 32 has a discharge opening 42, corresponding to the opening 15, and which is sealed by a strip 43, corresponding to the strip 16, so that any one of the flavoring materials 33, 34 or 35 may be utilized to flavor the food 40 after the container 39 has been opened and the packet 28 removed therefrom.

The envelopes 11, 22 and 29 obviously may be formed of transparent materials so that the flavoring materials contained therein may be seen through the walls of the envelopes after the packets have been removed from the food containers.

The flavoring packets may be employed with various other types of food products packaged for consumer sale and which do not constitute a dry-type food, including for example, applesauce which is canned unflavored and unsweetened for infants and which contains a flavoring packet which may be utilized for flavoring the applesauce for adult consumption.

Various other modifications and changes are contemplated and may be resorted to, without departing from the function or scope of the invention.

I claim as my invention:

1. In combination with a container for a food product which includes a liquid component, packaged for sale to a consumer, a sealed packet containing a flavoring material for the food product disposed in said container, and said packet providing means for buoyantly supporting the packet accessible on the surface of the liquid when the container is opened.

2. In a combination as defined by claim 1, said packet including a sealed envelope having a compartment containing the flavoring material and a gas filled space constituting said buoyancy means.

3. In a combination as defined by claim 2, said envelope having a second compartment hermetically sealed from the first mentioned compartment and defining said gas filled space.

4. In a combination as defined by claim 2, said gas filled space constituting a portion of the compartment containing the food flavoring.

5. In a combination as defined by claim 2, said envelope having a discharge port communicating with the compartment containing the food flavoring, and a readily removable sealing strip secured to the exterior of the envelope for closing and sealing the discharge port.

6. In a combination as defined by claim 2, said envelope being formed of a heat resistant, flexible material, such as, a plastic.

7. In a combination as defined by claim 2, said envelope being formed of a heat resistant, flexible material, such as, a metal foil.

8. In a combination as defined by claim 2, said packet including a sealed envelope having a plurality of separate compartments containing different flavoring materials, and means for selectively opening said compartments for removal of the flavoring contents therefrom.

References Cited

UNITED STATES PATENTS

| | | | |
|---|---|---|---|
| 2,719,660 | 10/1955 | Ellis | 53—22X |
| 2,791,324 | 5/1957 | Knoop et al. | 99—171CPOX |
| 2,835,596 | 5/1958 | Kaufman | 206—Inflat. Digest |
| 3,442,435 | 5/1969 | Ludder et al. | 99—171PP(UX) |

FRANK W. LUTTER, Primary Examiner

W. L. MENTLIK, Assistant Examiner

U.S. Cl. X.R.

206—47